United States Patent
Kamitani et al.

(10) Patent No.: US 6,623,863 B2
(45) Date of Patent: Sep. 23, 2003

(54) ARTICLE COATED WITH WATER-REPELLENT FILM, LIQUID COMPOSITION FOR COATING WITH WATER-REPELLENT FILM, AND PROCESS FOR PRODUCING ARTICLE COATED WITH WATER-REPELLENT FILM

(75) Inventors: Kazutaka Kamitani, Osaka-fu (JP); Hiroaki Yamamoto, Osaka-fu (JP)

(73) Assignee: Nippon Sheet Glass Co., Ltd. (JP)

( * ) Notice: Subject to any disclaimer, the term of this patent is extended or adjusted under 35 U.S.C. 154(b) by 0 days.

(21) Appl. No.: 09/822,719

(22) Filed: Mar. 30, 2001

(65) Prior Publication Data

US 2001/0024728 A1 Sep. 27, 2001

Related U.S. Application Data

(63) Continuation of application No. PCT/JP00/05081, filed on Aug. 1, 2000.

(30) Foreign Application Priority Data

Aug. 2, 1999 (JP) .......................................... H11-218855

(51) Int. Cl.$^7$ ................................................. B32B 9/04
(52) U.S. Cl. ...................... 428/429; 428/428; 428/446; 428/447; 428/696; 428/697
(58) Field of Search ................................. 428/446, 447, 428/448, 428, 429, 696, 697

(56) References Cited

U.S. PATENT DOCUMENTS 4,323,489 A * 4/1982 Beers ......................... 427/387
5,266,358 A    11/1993 Uemura et al. ............ 427/376.2
5,424,130 A     6/1995 Nakanishi et al. ............ 428/410
5,523,161 A     6/1996 Goodwin .................... 428/421
6,045,961 A *   4/2000 Heeks et al. ................. 399/325

FOREIGN PATENT DOCUMENTS

| EP | 0 776 925 A2 | 6/1997 |
| JP | 2-248480 A | 10/1990 |
| JP | 4-338137 A | 11/1992 |
| JP | 4-359086 A | 12/1992 |
| JP | 8-239653 A | 9/1996 |
| JP | 9-208898 A | 8/1997 |
| JP | 10-237380 A | 9/1998 |
| JP | 11-71682 A | 3/1999 |

* cited by examiner

Primary Examiner—Robert Dawson
Assistant Examiner—Michael J Feely
(74) Attorney, Agent, or Firm—David G. Conlin; Christine C. O'Day; Edwards & Angell, LLP

(57) ABSTRACT

There are provided articles coated with high-performance water-repellent films with high hardness that can withstand outdoor use, which are water-repellent film-coated articles that comprise a substrate and a water-repellent film composed mainly of silicon oxide and having a water-repellent group coated on the surface of the substrate, and are characterized by containing at least one type of metal oxide selected from the group consisting of magnesium oxide, calcium oxide, strontium oxide and boron oxide, as well as a process for preparation of such water-repellent film-coated articles at a high rate of productivity and a coating liquid composition for preparation of such water-repellent film-coated articles.

7 Claims, No Drawings

ARTICLE COATED WITH WATER-REPELLENT FILM, LIQUID COMPOSITION FOR COATING WITH WATER-REPELLENT FILM, AND PROCESS FOR PRODUCING ARTICLE COATED WITH WATER-REPELLENT FILM

This application is a continuation of international application PCT/JP00/05081, filed Aug. 1, 2000, published as WO 01/09266 A1 on Feb. 8, 2001.

TECHNICAL FIELD

The present invention relates to articles provided with a water-repellent film coating formed integrally with an primary oxide film on the surface of a substrate made of glass, ceramic, plastic, metal or the like, to a water-repellent film-coating composition and to a process for preparation of water-repellent film-coated articles.

BACKGROUND ART

The following techniques for formation of highly durable water-repellent films on the surfaces of glass plates and other substrates at a high rate of productivity are known, which involve formation of a single film on a substrate using a mixed solution of a primary layer component and a water-repellent component which gives a primary layer and a water-repellent layer.

In Japanese Unexamined Patent Publication No. 4-338137 there is disclosed a water-repellent glass characterized by applying of a solution comprising a mixture of a silicon alkoxide or a substituted silicon alkoxide wherein a portion of the alkoxyl groups are substituted with fluoroalkyl groups, an alcohol, water and an acid (or base) onto a glass substrate surface and sintering.

In Japanese Unexamined Patent Publication No. 8-239653 there are disclosed water-repellent articles treated with a composition comprising a mixture of a perfluoro-alkylalkylsilane and a thoroughly hydrolyzable silane (for example, tetrachlorosilane) dissolved in a solvent, preferably a non-aqueous solvent.

In Japanese Unexamined Patent Publication No. 11-71682 there are disclosed water-repellent film-coated articles treated with a composition comprising a chlorosilyl group-containing compound and a fluoroalkyl group-containing silane compound dissolved in an alcohol-based solvent.

In these conventional techniques, the final water-repellent article has been obtained by applying the coating solution onto the surface of the glass plate or the other substrate and then sintering at a temperature of 100–250° C. which is lower than the decomposition temperature of the fluoroalkyl groups (250–300° C.), or simply drying at ordinary temperature. The films obtained by these techniques are known as sol-gel water-repellent films and are obtained through a process whereby a hydrolyzable silane compound and a silane compound with a water-repellent group are hydrolyzed in a solution, subjected to dehydration/condensation reaction and then coated and dried on a substrate; in the sol-gel film, however, the solvent progressively evaporates as oxide bonds are formed, and therefore fine pores are present in the film when it is dried at 400° C. or below, so that the film does not have high hardness. In order to avoid the pores for increased film hardness, it has been essential to accomplish sintering at 500–600° C. However, heating at such high temperatures results in decomposition of the fluoroalkyl groups, making it impossible to achieve the desired water repellency. Consequently, water-repellent films obtained by the aforementioned technique of sintering at 250° C. or below, while being composed mainly of oxides, have not had the high hardness as oxides and ceramics which is achieved by, for example, melt methods.

When such water-repellent film-coated articles are used outdoors, for example, their exposure to such conditions as blown sand readily results in damage to the film surface, thus impairing the water-repellent property. The water-repellent film can also be damaged or peeled when the surface is wiped with a cloth or the like to remove attached dust, dirt or sand. Even in the absence of attached dust, etc., abrasion with a cloth or brush made of hard fibers (such as surface wiping of automobile window glass with a wiper, for example) forms small nicks and further promote deterioration of the water-repellent film.

It is an object of the present invention, which has been accomplished in light of these problems, to provide articles coated with high-performance water-repellent films having high hardness that can withstand outdoor use, a process for preparation of such water-repellent film-coated articles at a high rate of productivity, and a coating liquid composition for preparation of such water-repellent film-coated articles.

DISCLOSURE OF THE INVENTION

As a result of much diligent research by the present inventors aimed at overcoming the aforementioned problems, it has been discovered that by providing a primary oxide film with two or more components including $SiO_2$ and at least one type selected from among MgO, CaO, SrO and $B_2O_3$ in a water-repellent film-coated article having a primary oxide layer and a water-repellent layer integrally formed by a single coating treatment, the hardness of the water-repellent film with the integrally formed primary layer and water-repellent layer is drastically improved.

In other words, the present invention relates to a water-repellent film-coated article comprising a substrate and a water-repellent film composed mainly of silicon oxide and having a water-repellent group coated on the surface of the substrate, the water-repellent film-coated article being characterized in that the water-repellent film contains at least one type of metal oxide selected from the group consisting of magnesium oxide, calcium oxide, strontium oxide and boron oxide.

For formation of oxide films by a sol-gel method it is common to use a silicon alkoxide as the starting material, and this is because the reactivity of silicon alkoxides readily gives a uniform, transparent film by a milder reaction than with alkoxides of elements other than silicon. However since, as mentioned above, the solvent progressively evaporates as bonds (siloxane bonds) are formed between the Si (silicon) and O (oxygen) by dehydration/condensation reaction in the sol-gel method, a porous silica film is obtained wherein fine pores are present in the film. Since the Si and O bonds are covalent bonds and Si and O bond with a high bonding energy, when siloxane bonds form a somewhat three-dimensional structure at the solvent volatilization stage, contraction of the structure is suppressed even with subsequent further dehydration/condensation reaction, such that a volatilized portion of the solvent and the alcohol produced by the dehydration/condensation reaction remains as fine pores, with silanol or unreacted alkoxyl groups present in the fine pores. The hardness of the porous silica film is not very high because of its porosity. When the film is heated at a temperature of 500° C. or above, the fine pores in the film disappear producing a non-porous silica film with high hardness, but it is difficult to form an integral film with high hardness containing substances that decompose at the heating temperature.

According to the invention, the strong ionic nature of magnesium (Mg), calcium (Ca) and strontium (Sr) is utilized: they are dissolved in the coating solution to be copresent with the thoroughly hydrolyzable silane compound, such as a silicon alkoxide, and exist in an ionic state in the solution even at the solvent volatilization stage. Because Mg, Ca and Sr are divalent, they react with silanol, eventually bonding with two oxygen atoms in the film interior as shown in Equation (1), and forming an "O⁻ ⁺M⁺ ⁻O" bond which has a freer bonding orientation than an "Si—O—Si" bond, to thereby fill in the gaps of the siloxane skeleton.

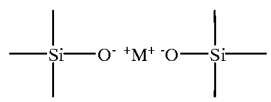

(1)

(M represents Mg, Ca or Sr)

When simply dried at normal temperature, for example, this film has about the same hardness as if a silica component alone was used, but heating at a temperature of 50–300° C. contracts the siloxane bonds by action of the Mg (or Ca or Sr), and this eliminates pores and results in a film with high hardness and high durability comparable to inorganic glass prepared by a melt method. That is, while heating at a temperature of 500° C. or above is necessary to eliminate the pores of a simple porous silica film, the porous silica-based film of the invention which contains MgO, CaO or SrO can be rendered pore-free at a temperature of 200° C. or more below that temperature. Furthermore, since the film is heated at a temperature lower than the decomposition temperature of the water-repellent groups such as fluoroalkyl groups or alkyl groups (300° C. or higher), the fluoroalkyl groups or alkyl groups contained in the coating solution reside on the film surface without decomposition, thus providing excellent water repellency and durability. When only a silica component with water-repellent groups is present, the film has insufficient hardness and low durability with heat hardening at 300° C. or below, and heating at a temperature of 500° C. or above is necessary to eliminate the film pores and increase the film hardness, which in turn sacrifices the high water repellency.

Addition of an oxide of boron (B) to the silica also provides a low temperature hardening property and gives a pore-free film with high hardness by heating at a temperature of 300° C. or below, as with addition of Mg, Ca or Sr described above. While it is not yet fully understood why B exhibits a similar effect as Mg, Ca and Sr, it is thought to be attributable to a change in the configuration of oxygen due to the heating immediately after coating.

If the content of magnesium oxide, calcium oxide, strontium oxide and boron oxide in the water-repellent film is too low the low temperature hardening effect will not be obtained, while if it is too high the oxides will segregate to a non-uniform condition, thus lowering the film hardness; the water-repellent film therefore preferably contains silicon oxide, magnesium oxide, calcium oxide, strontium oxide and boron oxide in the following proportions, based on $SiO_2$, MgO, CaO, SrO and $BO_{3/2}$, respectively:

silicon oxide at 70–99%, and at least one type of metal oxide selected from the group consisting of magnesium oxide, calcium oxide, strontium oxide and boron oxide at a total of 1–30%, in terms of mole percent; the water-repellent film also preferably contains silicon oxide, magnesium oxide, calcium oxide, boron oxide and zirconium oxide in the following proportions, based on $SiO_2$, MgO, CaO, $BO_{3/2}$ and $ZrO_2$, respectively:

silicon oxide at 70–98%, magnesium oxide and/or calcium oxide at 1–29%, and boron oxide and/or zirconium oxide at 1–29%, in terms of mole percent.

Certain combinations among these give superior low temperature hardening properties. Specifically, they are the four combinations Si—Mg—B, Si—Ca—B, Si—Mg—Zr and Si—Ca—Zr. These sol-gel oxide films harden by, for example, heating at 200–250° C. for films with a film thickness of about 150 nm and heating at about 100° C. for films with a film thickness of a few dozen nm or less, giving water-repellent films with high hardness.

Thus, according to the present invention an oxide film of two or more components including silicon oxide and at least one type selected from among magnesium oxide, calcium oxide, strontium oxide and boron oxide as essential components is used as the primary oxide layer to allow elimination of pores from the primary oxide film at below the decomposition temperature of the water-repellent layer. Water-repellent film-coated articles obtained thereby have high hardness or durability that has not been possible in the past with water-repellent film-coated articles with integrally formed primary oxide layers and water-repellent layers by a single coating treatment.

The low temperature hardening property of the water-repellent film of the invention is not impaired even when a transition metal element or the like is further introduced into the silica film for the purpose of adding another function in addition to the water-repellent function, such as control of the refractive index of the film or control of the visible light transmittance. In other words, by including a metal element exhibiting a desired function along with the Mg, Ca, Sr or B it is possible to obtain a multifunctional film having very high hardness even with heating at a temperature of 300° C. or below, while also having both water-repellent and other functions. For example, addition of cobalt oxide, iron oxide, nickel oxide or copper oxide will impart coloring to the water-repellent film.

When the water-repellent film of the invention contains zirconium oxide, it may include as other components cobalt oxide, iron oxide, nickel oxide, copper oxide, aluminum oxide, gallium oxide, indium oxide, scandium oxide, yttrium oxide, lanthanum oxide, cerium oxide and zinc oxide at a total of 0.5–5% in terms of mole percent, based on CoO, $FeO_{3/2}$, $NiO_2$, CuO, $AlO_{3/2}$, $GaO_{3/2}$, $InO_{3/2}$, $ScO_{3/2}$, $YO_{3/2}$, $LaO_{3/2}$, $CeO_{3/2}$ and ZnO.

When the water-repellent film of the invention contains no zirconium oxide, it may include as other components cobalt oxide, iron oxide, nickel oxide, copper oxide, zirconium oxide, aluminum oxide, gallium oxide, indium oxide, scandium oxide, yttrium oxide, lanthanum oxide, cerium oxide and zinc oxide at a total of 0.5–5% in terms of mole percent, based on CoO, $FeO_{3/2}$, $NiO_2$, CuO, $ZrO_2$, $AlO_{3/2}$, $GaO_{3/2}$, $InO_{3/2}$, $ScO_{3/2}$, $YO_{3/2}$, $LaO_{3/2}$, $CeO_{3/2}$ and ZnO.

In either case, addition of these components at a total in excess of 5 mole percent may produce an undesirable appearance, such as film peeling or film whitening.

If the thickness of the water-repellent film is too great the film hardness will tend to be lower, and if it is too small the film durability will tend to be lower. The thickness of the water-repellent film is therefore preferably 5–200 nm, more preferably 5–100 nm and even more preferably 5–50 nm. The water-repellent film preferably contains the water-repellent groups, for example alkyl groups or fluoroalkyl groups, at 0.01–20 wt %. The water-repellent groups are present at a high density on the outer surface of the water-repellent film.

The present invention also provides a water-repellent film-coating composition containing (A) a thoroughly hydrolyzable silane compound, (B) a silane compound with a water-repellent group, (C) an acid and (D) at least one metal compound selected from the group consisting of magnesium, calcium, strontium and boron.

The thoroughly hydrolyzable silane compound (A) according to the invention is not particularly limited, and tetraalkoxysilanes such as tetramethoxysilane, tetraethoxysilane, tetrapropoxysilane and tetrabutoxysilane, as well as tetrachlorosilane, tetraacyloxysilane and tetraisocyanatesilane may be mentioned. Tetraalkoxysilanes are preferred for use among these because of their relative ease of handling. Among tetraalkoxysilanes, those of relatively low molecular weight, for example tetraalkoxysilanes comprising alkoxyl groups of 3 or fewer carbon atoms, are preferred for use because they readily give dense films. Also, polymers of these tetraalkoxysilanes, with average polymerization degrees of 5 or lower, are preferred for use.

The silane compound with a water-repellent group (B) according to the invention is a silane compound with one, two or more water-repellent groups (alkyl groups, fluoroalkyl groups, etc.) in the molecule, and there may be mentioned silane compounds which are the aforementioned silane compounds (A) a portion of which is substituted with an alkyl group and/or fluoroalkyl group.

Examples of alkyl group-containing silane compounds include alkyl group-containing chlorosilanes such as $CH_3(CH_2)_{30}SiCl_3$, $CH_3(CH_2)_{20}SiCl_3$,
$CH_3(CH_2)_{18}SiCl_3$, $CH_3(CH_2)_{16}SiCl_3$,
$CH_3(CH_2)_{14}SiCl_3$, $CH_3(CH_2)_{12}SiCl_3$,
$CH_3(CH_2)_{10}SiCl_3$, $CH_3(CH_2)_9SiCl_3$,
$CH_3(CH_2)_8SiCl_3$, $CH_3(CH_2)_7SiCl_3$,
$CH_3(CH_2)_6SiCl_3$, $CH_3(CH_2)_5SiCl_3$,
$CH_3(CH_2)_4SiCl_3$, $CH_3(CH_2)_3SiCl_3$,
$CH_3(CH_2)_2SiCl_3$, $CH_3CH_2SiCl_3$,
$(CH_3CH_2)_2SiCl_2$, $(CH_3CH_2)_3SiCl$,
$CH_3SiCl_3$, $(CH_3)_2SiCl_2$, $(CH_3)_3SiCl$;

alkyl group-containing alkoxysilanes such as $CH_3(CH_2)_{30}Si(OCH_3)_3$, $CH_3(CH_2)_{20}Si(OCH_3)_3$,
$CH_3(CH_2)_{18}Si(OCH_3)_3$, $CH_3(CH_2)_{16}Si(OCH_3)_3$,
$CH_3(CH_2)_{14}Si(OCH_3)_3$, $CH_3(CH_2)_{12}Si(OCH_3)_3$,
$CH_3(CH_2)_{10}Si(OCH_3)_3$, $CH_3(CH_2)_9Si(OCH_3)_3$,
$CH_3(CH_2)_8Si(OCH_3)_3$, $CH_3(CH_2)_7Si(OCH_3)_3$,
$CH_3(CH_2)_6Si(OCH_3)_3$, $CH_3(CH_2)_5Si(OCH_3)_3$,
$CH_3(CH_2)_4Si(OCH_3)_3$, $CH_3(CH_2)_3Si(OCH_3)_3$,
$CH_3(CH_2)_2Si(OCH_3)_3$, $CH_3CH_2Si(OCH_3)_3$,
$(CH_3CH_2)_2Si(OCH_3)_2$, $(CH_3CH_2)_3SiOCH_3$,
$CH_3Si(OCH_3)_3$, $(CH_3)_2Si(OCH_3)_2$, $(CH_3)_3SiOCH_3$,
$CH_3(CH_2)_{30}Si(OC_2H_5)_3$, $CH_3(CH_2)_{20}Si(OC_2H_5)_3$,
$CH_3(CH_2)_{18}Si(OC_2H_5)_3$, $CH_3(CH_2)_{16}Si(OC_2H_5)_3$,
$CH_3(CH_2)_{14}Si(OC_2H)_3$, $CH_3(CH_2)_{12}Si(OC_2H_5)_3$,
$CH_3(CH_2)_{10}Si(OC_2H_5)_3$, $CH_3(CH_2)_9Si(OC_2H_5)_3$,
$CH_3(CH_2)_8Si(OC_2H_5)_3$, $CH_3(CH_2)_7Si(OC_2H_5)_3$,
$CH_3(CH_2)_6Si(OC_2H_5)_3$, $CH_3(CH_2)_5Si(OC_2H_5)_3$,
$CH_3(CH_2)_4Si(OC_2H_5)_3$, $CH_3(CH_2)_3Si(OC_2H_5)_3$,
$CH_3(CH_2)_2Si(OC_2H_5)_3$, $CH_3CH_2Si(OC_2H_5)_3$,
$(CH_3CH_2)_2Si(OC_2H_5)_2$, $(CH_3CH_2)_3SiOC_2H_5$,
$CH_3Si(OC_2H_5)_3$, $(CH_3)_2Si(OC_2H_5)_2$, $(CH_3)_3SiOC_2H_5$;

alkyl group-containing acyloxysilanes such as $CH_3(CH_2)_{30}Si(OCOCH_3)_3$, $CH_3(CH_2)_{20}Si(OCOCH_3)_3$,
$CH_3(CH_2)_{18}Si(OCOCH_3)_3$, $CH_3(CH_2)_{16}Si(OCOCH_3)_3$,
$CH_3(CH_2)_{14}Si(OCOCH_3)_3$, $CH_3(CH_2)_{12}Si(OCOCH_3)_3$,
$CH_3(CH_2)_{10}Si(OCOCH_3)_3$, $CH_3(CH_2)_9Si(OCOCH_3)_3$,
$CH_3(CH_2)_8Si(OCOCH_3)_3$, $CH_3(CH_2)_7Si(OCOCH_3)_3$,
$CH_3(CH_2)_6Si(OCOCH_3)_3$, $CH_3(CH_2)_5Si(OCOCH_3)_3$,
$CH_3(CH_2)_4Si(OCOCH_3)_3$, $CH_3(CH_2)_3Si(OCOCH_3)_3$,
$CH_3(CH_2)_2Si(OCOCH_3)_3$, $CH_3CH_2Si(OCOCH_3)_3$,
$(CH_3CH_2)_2Si(OCOCH_3)_2$, $(CH_3CH_2)_3SiOCOCH_3$,
$CH_3Si(OCOCH_3)_3$, $(CH_3)_2Si(OCOCH_3)_2$,
$(CH_3)_3SiOCOCH_3$;

and alkyl group-containing isocyanatesilanes such as $CH_3(CH_2)_{30}Si(NCO)_3$, $CH_3(CH_2)_{20}Si(NCO)_3$,
$CH_3(CH_2)_{18}Si(NCO)_3$, $CH_3(CH_2)_{16}Si(NCO)_3$,
$CH_3(CH_2)_{14}Si(NCO)_3$, $CH_3(CH_2)_{12}Si(NCO)_3$,
$CH_3(CH_2)_{10}Si(NCO)_3$, $CH_3(CH_2)_9Si(NCO)_3$,
$CH_3(CH_2)_8Si(NCO)_3$, $CH_3(CH_2)_7Si(NCO)_3$,
$CH_3(CH_2)_6Si(NCO)_3$, $CH_3(CH_2)_5Si(NCO)_3$,
$CH_3(CH_2)_4Si(NCO)_3$, $CH_3(CH_2)_3Si(NCO)_3$,
$CH_3(CH_2)_2Si(NCO)_3$, $CH_3CH_2Si(NCO)_3$,
$(CH_3CH_2)_2Si(NCO)_2$, $(CH_3CH_2)_3SiNCO$,
$CH_3Si(NCO)_3$, $(CH_3)_2Si(NCO)_2$,
$(CH_3)_3SiNCO$.

Among these alkyl group-containing silane compounds it is preferred to use chlorosilanes, alkoxysilanes, acyloxysilanes and isocyanatesilanes containing alkyl groups of 8 or more carbon atoms, such as the following.

Octyltrimethyoxysilane $CH_3(CH_2)_7Si(OCH_3)_3$,
octyltrichlorosilane $CH_3(CH_2)_7Si(Cl)_3$,
nonyltrimethoxysilane $CH_3(CH_2)_8Si(OCH_3)_3$,
nonyltrichlorosilane $CH_3(CH_2)_8Si(Cl)_3$,
decyltrimethoxysilane $CH_3(CH_2)_9Si(OCH_3)_3$,
decyltrichlorosilane $CH_3(CH_2)_9Si(Cl)_3$,
undecyltrimethoxysilane $CH_3(CH_2)_{10}Si(OCH_3)_3$,
undecyltrichlorosilane $CH_3(CH_2)_{10}Si(Cl)_3$,
dodecyltrimethoxysilane $CH_3(CH_2)_{11}Si(OCH_3)_3$,
dodecyltrichlorosilane $CH_3(CH_2)_{11}Si(Cl)_3$.

Examples of fluoroalkyl group-containing silane compounds include fluoroalkyl group-containing trichlorosilanes such as $CF_3(CF_2)_{11}(CH_2)_2SiC_3$,
$CF_3(CF_2)_{10}(CH_2)_2Si(Cl)_3$,
$CF_3(CF_2)_9(CH_2)_2SiCl_3$,
$CF_3(CF_2)_8(CH_2)_2SiCl_3$,
$CF_3(CF_2)_7(CH_2)_2SiCl_3$,
$CF_3(CF_2)_6(CH_2)_2SiCl_3$,
$CF_3(CF_2)_5(CH_2)_2SiCl_3$,
$CF_3(CF_2)_4(CH_2)_2SiCl_3$,
$CF_3(CF_2)_3(CH_2)_2SiCl_3$,
$CF_3(CF_2)_2(CH_2)_2SiCl_3$, $CF_3CF_2(CH_2)_2SiCl_3$,
$CF_3(CH_2)_2SiCl_3$;

fluoroalkyl group-containing trialkoxysilanes such as $CF_3(CF_2)_{11}(CH_2)_2Si(OCH_3)_3$,
$CF_3(CF_2)_{10}(CH_2)_2Si(OCH_3)_3$,
$CF_3(CF_2)_9(CH_2)_2Si(OCH_3)_3$,
$CF_3(CF_2)_8(CH_2)_2Si(OCH_3)_3$,
$CF_3(CF_2)_7(CH_2)_2Si(OCH_3)_3$,
$CF_3(CF_2)_6(CH_2)_2Si(OCH_3)_3$,
$CF_3(CF_2)_5(CH_2)_2Si(OCH_3)_3$,
$CF_3(CF_2)_4(CH_2)_2Si(OCH_3)_3$,
$CF_3(CF_2)_3(CH_2)_2Si(OCH_3)_3$,
$CF_3(CF_2)_2(CH_2)_2Si(OCH_3)_3$,
$CF_3CF_2(CH_2)_2Si(OCH_3)_3$,
$CF_3(CH_2)_2Si(OCH_3)_3$,
$CF_3(CF_2)_{11}(CH_2)_2Si(OC_2H_5)_3$,
$CF_3(CF_2)_{10}(CH_2)_2Si(OC_2H_5)_3$,
$CF_3(CF_2)_9(CH_2)_2Si(OC_2H_5)_3$,
$CF_3(CF_2)_8(CH_2)_2Si(OC_2H_5)_3$,
$CF_3(CF_2)_7(CH_2)_2Si(OC_2H_5)_3$,
$CF_3(CF_2)_6(CH_2)_2Si(OC_2H_5)_3$,
$CF_3(CF_2)_5(CH_2)_2Si(OC_2H_5)_3$,
$CF_3(CF_2)_4(CH_2)_2Si(OC_2H_5)_3$,
$CF_3(CF_2)_3(CH_2)_2Si(OC_2H_5)_3$,
$CF_3(CF_2)_2(CH_2)_2Si(OC_2H_5)_3$,
$CF_3CF_2(CH_2)_2Si(OC_2H_5)_3$,
$CF_3(CH_2)_2Si(OC_2H_5)_3$;

fluoroalkyl group-containing triacyloxysilanes such as $CF_3(CF_2)_{11}(CH_2)_2Si(OCOCH_3)_3$,
$CF_3(CF_2)_{10}(CH_2)_2Si(OCOCH_3)_3$,
$CF_3(CF_2)_9(CH_2)_2Si(OCOCH_3)_3$,
$CF_3(CF_2)_8(CH_2)_2Si(OCOCH_3)_3$,
$CF_3(CF_2)_7(CH_2)_2Si(OCOCH_3)_3$,
$CF_3(CF_2)_6(CH_2)_2Si(OCOCH_3)_3$,
$CF_3(CF_2)_5(CH_2)_2Si(OCOCH_3)_3$,
$CF_3(CF_2)_4(CH_2)_2Si(OCOCH_3)_3$,
$CF_3(CF_2)_3(CH_2)_2Si(OCOCH_3)_3$,
$CF_3(CF_2)_2(CH_2)_2Si(OCOCH_3)_3$,
$CF_3CF_2(CH_2)_2Si(OCOCH_3)_3$,
$CF_3(CH_2)_2Si(OCOCH_3)_3$;

and fluoroalkyl group-containing triisocyanatesilanes such as $CF_3(CF_2)_{11}(CH_2)_2Si(NCO)_3$,
$CF_3(CF_2)_{10}(CH_2)_2Si(NCO)_3$,
$CF_3(CF_2)_9(CH_2)_2Si(NCO)_3$,
$CF_3(CF_2)_8(CH_2)_2Si(NCO)_3$,
$CF_3(CF_2)_7(CH_2)_2Si(NCO)_3$,
$CF_3(CF_2)_6(CH_2)_2Si(NCO)_3$,
$CF_3(CF_2)_5(CH_2)_2Si(NCO)_3$,
$CF_3(CF_2)_4(CH_2)_2Si(NCO)_3$,
$CF_3(CF_2)_3(CH_2)_2Si(NCO)_3$,
$CF_3(CF_2)_2(CH_2)_2Si(NCO)_3$,
$CF_3CF_2(CH_2)_2Si(NCO)_3$,
$CF_3(CH_2)_2Si(NCO)_3$.

Among these fluoroalkyl group-containing silane compounds there are preferred trichlorosilanes, trialkoxysilanes and triisocyanatesilanes containing fluoroalkyl groups with 10 or more fluorine atoms, of which $CF_3(CF_2)_7(CH_2)_2Si(OCH_3)_3$ (heptadecafluorodecyl trimethoxysilane) and $CF_3(CF_2)_7(CH_2)_2SiCl_3$ (heptadecafluorodecyl trichlorosilane) are particularly preferred.

The acid (C) according to the invention is preferably a volatile acid such as hydrochloric acid, hydrofluoric acid, nitric acid, acetic acid, formic acid, trifluoroacetic acid or the like from the standpoint of volatilization by drying at ordinary temperature without remaining in the film, and hydrochloric acid is particularly preferred among these because of its high degree of electrolytic dissociation and volatilization and its relative safety during handling.

At least one type of metal compounds selected from the group consisting of magnesium, calcium, strontium and boron (D) according to the invention may be any chlorides, oxychlorides, oxides, hydroxides, nitrates, oxynitrates, etc. of the aforementioned metals, so long as they undergo simple electrolytic dissociation to dissolve in water or alcohol. Among these, it is particularly preferred to use chlorides, oxychlorides, nitrates and oxynitrates.

Specific examples for component (D) include $MgCl_2$, $Mg(NO_3)_2$, $CaCl_2$, $Ca(NO_3)_2$, $SrCl_2$, $Sr(NO_3)_2$ and $H_3BO_3$.

The zirconium oxide is not an essential component, but including it with the magnesium oxide or calcium oxide increases the low temperature hardening property, and therefore a zirconium compound, for example a chloride, oxychloride, oxide, hydroxide, nitrate or oxynitrate, which undergoes simple electrolytic dissociation to dissolve in water or alcohol, may be included in the water-repellent film-coating composition. Specific examples of such compounds include $ZrOCl_2$ and $ZrO(NO_3)_2$.

As an additional component (component (E)) there may be added to the water-repellent film-coating composition at least one metal compound selected from the group consisting of cobalt, iron, nickel, copper, aluminum, gallium, indium, scandium, yttrium, lanthanum, cerium and zinc, such as a chloride, oxychloride, oxide, hydroxide, nitrate or oxynitrate of one or more of these metals, as the starting material for cobalt oxide, iron oxide, nickel oxide, copper oxide, aluminum oxide, gallium oxide, indium oxide, scandium oxide, yttrium oxide, lanthanum oxide, cerium oxide and zinc oxide, for the purpose of imparting the aforementioned functions of control of the refractive index of the film or control of the visible light transmittance. Any of these compounds are suitable so long as they dissociate in water or alcohol, and those that undergo simple electrolytic dissociation are especially preferred. In other words, it preferably decomposes without producing oxide precipitation, etc., and is present in the coating solution in an ion state.

Specific examples of the aforementioned component (E) include $AlCl_3$, $GaCl_3$, $InCl_3$, $ScCl_3$, $YCl_3$, $LaCl_3$, $CeCl_3$, $CoCl_2$, $ZnCl_2$, $Al(NO_3)_3$, $Ga(NO_3)_3$, $In(NO_3)_3$, $Sc(NO_3)_3$, $Y(NO_3)_3$, $La(NO_3)_3$, $Ce(NO_3)_3$, $Co(NO_3)_2$, $Zn(NO_3)_2$.

The water-repellent film-coating composition preferably contains the silane compound (A) at 0.01–2 wt % based on silica, the silane compound (B) at 0.00001–0.15 wt % based on silica, the acid at 0.001–3 N, water at 0–5 wt %, the compound (D) at a molar ratio of 0.01–0.4 with respect to the silane compound (A), and the component (E) at a molar ratio of 0–0.4 with respect to the silane compound (A).

The solvent for the water-repellent film-coating composition is not particularly limited, but hydrocarbons such as hexane, toluene and cyclohexane, halogenated hydrocarbons such as methyl chloride, carbon tetrachloride and trichloroethylene, ketones such as acetone and methyl ethyl ketone, nitrogen-containing compounds such as diethylamine, esters such as ethyl acetate, and alcohols may be used. Preferred for use among these are alcohol-based solvents, examples of which include methanol, ethanol, 1-propanol, 2-propanol, butyl alcohol, amyl alcohol and the like among which straight-chain saturated monohydric alcohols of 3 or fewer carbon atoms, such as methanol, ethanol, 1-propanol and 2-propanol are even more preferred for use because of their high volatilization rates at ordinary temperature.

These alcohols may also contain water at from 0 wt % to 50 wt %. Commercially available high-grade alcohols usually contain water at 0.2 wt % or more, and according to the invention they are preferably used to avoid cost-raising treatments such as dewatering treatment. For addition of the metal starting materials, even when the metal compounds are added after first being dissolved in water, the amount of water in the final water-repellent film-coating composition may be 50 wt % or less with respect to the amount of solvent. The amount of water is preferably not greater than 50 wt % because this will prevent a uniform, transparent film from being formed.

A preferred water-repellent film-coating composition according to the invention contains (A) a thoroughly hydrolyzable silane compound or its hydrolysate at 0.01–2 wt % (based on silica), (B) a silane compound with a water-repellent group at 0.00001–0.15 wt % (based on silica), (C) an acid at 0.001–3 N, (D) at least one type of metal compound selected from the group consisting of magnesium, calcium, strontium and boron at a molar ratio of 0.01–0.4 based on MgO, CaO, SrO and $BO_{3/2}$, with respect to the silane compound (A), (E) at least one type of metal compound selected from the group consisting of cobalt, iron, nickel, copper, zirconium, aluminum, gallium, indium, scandium, yttrium, lanthanum, cerium and zinc at a molar ratio of 0–0.4 based on CoO, $FeO_{3/2}$, $NiO_2$, CuO, $AlO_{3/2}$, $GaO_{3/2}$, $InO_{3/2}$, $ScO_{3/2}$, $YO_{3/2}$, $LaO_{3/2}$, $CeO_{3/2}$ and ZnO, with respect to the silane compound (A), (F) water at 0–20 wt % and (G) an alcohol constituting the remainder.

An even more preferred water-repellent film-coating composition contains (A) a thoroughly hydrolyzable silane compound or its hydrolysate at 0.01–2 wt % (based on silica), (B) a silane compound with a water-repellent group at 0.00001–0.15 wt % (based on silica), (C) an acid at 0.001–3 N, (D-1) a magnesium and/or calcium compound at a molar ratio of 0.01–0.4 based on MgO and CaO, with respect to the silane compound (A) (based on $SiO_2$), (D-2) a boron and/or zirconium compound at a molar ratio of 0.01–0.4 based on $BO_{3/2}$ and $ZrO_2$, with respect to the silane compound (A) (based on $SiO_2$), (E) at least one type of metal compound selected from the group consisting of cobalt, iron, nickel, copper, aluminum, gallium, indium, scandium, yttrium, lanthanum, cerium and zinc at a molar ratio of 0–0.4 based on CoO, $FeO_{3/2}$, $Nia_2$, CuO, $AlO_{3/2}$, $GaO_{3/2}$, $InO_{3/2}$, $ScO_{3/2}$, $YO_{3/2}$, $LaO_{3/2}$, $CeO_{3/2}$ and ZnO, with respect to the silane compound (A) (based on $SiO_2$), (F) water at 0–20 wt % and (G) an alcohol constituting the remainder.

The method of coating the water-repellent film-coating composition of the invention is not particularly limited, but preferably the substrate is evenly wetted with the coating solution composition and then stationed for drying to hardness. This allows formation of a highly oriented water-repellent layer as the fluoroalkyl groups and alkyl groups collect on the liquid surface during volatilization of the solvent. Here, the stationing is sufficient so long as the coating solution applied to the substrate is not disturbed, and the substrate may even be gently moved in a parallel direction during the application.

Specific examples of coating methods include dip coating, flow coating, curtain coating, spin coating, spray coating, bar coating, roll coating, brush coating and the like.

The drying according to the invention is carried out in an atmosphere at room temperature or a temperature of 300° C. or below, and preferably at 40% or lower relative humidity. The coated state of the highly oriented surface is therefore maintained without decomposition of the integrally coated alkyl groups or fluoroalkyl groups. As a result it is possible to obtain a water-repellent film with a low temperature hardening property as well as excellent water-repellent performance including droplet roll-over properties and excellent durability due to its high hardness. Because of the low heating temperature, even when an alkali component is present in the substrate there is low diffusion thereof in the water-repellent film, thus preventing reduction in durability of the water-repellent property due the alkali.

As substrates for the invention there may be mentioned transparent and non-transparent plates, bars and other various forms of glass, ceramic, plastic or metal. When few hydrophilic groups are present on the surface of the substrate, it is preferred to pretreat the surface with an oxygen-containing plasma or corona atmosphere for hydrophilic treatment, or to irradiate the substrate surface with ultraviolet rays of a wavelength near 200–300 nm in an oxygen-containing atmosphere for hydrophilic treatment, followed by surface treatment.

BEST MODE FOR CARRYING OUT THE INVENTION

Embodiments of the present invention will now be explained in detail by way of examples.

EXAMPLE 1

To 97.68 g of ethanol (moisture content: 0.35 wt %) there were added 0.02 g of heptadecafluorodecyl trimethoxysilane $(CF_3(CF_2)_7(CH_2)_2Si(OCH_3)_3$, product of Shinetsu Silicone), 0.24 g of tetraethoxysilane $(Si(OCH_2CH_3)_{41}$ product of Shinetsu Silicone), 0.0586 g of magnesium chloride hexahydrate (product of Kanto Kagaku) and 2 g of concentrated hydrochloric acid (35 wt %, product of Kanto Kagaku) while stirring, to obtain a coating solution. Table 1 shows the types and amounts (molar ratios) of the tetraethoxysilane (TEOS), heptadecafluorodecyl trimethoxysilane (FAS), and magnesium or calcium starting materials in the coating solution. The total weight of the TEOS and magnesium starting material (or calcium starting material) in the coating solution (wt % based on $SiO_2$, MgO and CaO) was 0.08 wt %. This water-repellent coating solution was applied to the surface of a washed soda lime silicate glass-composed glass substrate (3.4 mm×150×150 mm) at 30% humidity and room temperature (20° C.) using a flow coating method, and then dried at room temperature for about one minute to obtain a water-repellent glass plate. The composition of the water-repellent film was as shown in Table 1. The value for the water-repellent groups is given with respect to 100 mole percent as the total for all of the oxides, and it was 2.4 mole percent based on FAS (likewise for the following examples and comparative examples). The proportion of water-repellent groups (the $CF_3(CF_2)_7(CH_2)_2$-portion) was 16 wt % with respect to the total weight of the film.

The water contact angle for the resulting water-repellent glass plate was measured using a contact angle instrument (CA-DT, product of Kyowa Surfactant Chemistry, KK.), as the static contact angle for a water droplet of 2 mg weight. A larger value for the contact angle indicates better static water repellency.

As an index for the roll-over performance of water droplets on the surface of the water-repellent glass plate, a 5-mm diameter water droplet was placed on the horizontally positioned water-repellent glass plate surface, and then the water-repellent glass plate was slowly tilted until the water droplet placed on the surface first began to roll, at which point the tilt angle (critical tilt angle) of the glass plate was measured. A smaller critical tilt angle indicates better dynamic water repellency, and for example, better dispersion of rain droplets adhering to the front glass window of a moving automobile, thus causing less blockage of the field of vision of the driver.

Evaluation of the hardness of the water-repellent film was carried out according to the abrasion test specified by JIS R 3212. Specifically, a commercially available Taber abrasion test was conducted with 1000 abrasion passes at a weight of 500 g, with measurement of the haze value before and after the abrasion test and optical microscope observation of any film peeling before and after the abrasion test. The film was checked for peeling after the abrasion test, and any film that exhibited no peeling was also measured for haze value.

Table 2 shows the film thickness, contact angle, critical tilt angle, haze value before and after the Taber abrasion test and film peeling before and after the abrasion test for the water-repellent film. The resulting film had an especially low critical tilt angle of 4°, and this was believed to indicate that the Mg ions had filled the gaps in the silica porous body, thus improving the smoothness of the film.

EXAMPLES 2–10

Water-repellent glass was obtained in the same manner as Example 1, except that the metal atom starting materials and addition amounts in the coating solution of Example 1 were changed to those shown in Table 1. The compositions of the water-repellent films were as shown in Table 1. The results of measurement in the same manner as Example 1 are shown in Table 2. The total weight of the TEOS and magnesium starting material (or calcium or strontium starting material) in the coating solutions (wt % based on $SiO_2$, MgO, CaO or SrO) was 0.08 wt %.

The films obtained in the same manner as Example 1 had very low critical tilt angles of 4°, and this was believed to indicate that the Mg, Ca and Sr ions had filled the gaps in the silica porous bodies, thus improving the smoothness of the films.

COMPARATIVE EXAMPLE 1

To 85.3 g of ethanol there were added 40 g of tetraethoxysilane and 1.92 g of heptadecafluorodecyl trimethoxysilane, and after 20 minutes of stirring, 16.6 g of water and 20.8 g of 0.1 N hydrochloric acid were added and the mixture was stirred for 2 hours, placed in a sealed container and allowed to stand at 25° C. for 24 hours to obtain a water-repellent coating solution. The composition of the water-repellent coating solution is shown in Table 1. A washed glass plate was immersed in the water-repellent coating solution and lowered for coating, and after drying it was fired at 250° C. for one hour to obtain a water-repellent glass plate. The composition of the water-repellent film was as shown in Table 1. The TEOS weight in the coating solution (based on $SiO_2$) was 6.5 wt %.

As shown in Table 2, the resulting water-repellent glass plate had an initial critical tilt angle of 180, which was large compared to Examples 1–7, and poor water droplet roll-over. When Comparative Example 1 was dried at room temperature instead of at 250° C. for one hour, the water droplet roll-over was unchanged but the film underwent considerable scratching by mere light rubbing with a cloth.

COMPARATIVE EXAMPLE 2

To 97.68 g of ethanol (moisture content: 0.35 wt %) there were added 0.02 g of heptadecafluorodecyl trimethoxysilane $(CF_3(CF_2)_7(CH_2)_2Si(OCH_3)_3$, product of Shinetsu Silicone), 0.3 g of tetraethoxysilane $(Si(OCH_2CH_3)_4$, product of Shinetsu Silicone) and 2 g of concentrated hydrochloric acid (35 wt %, product of Kanto Kagaku) while stirring, to obtain a coating solution. A water-repellent glass plate was otherwise obtained in the same manner as Example 1. The composition of the water-repellent film was as shown in Table 1. The weight of the TEOS in the coating solution (based on $SiO_2$) was 0.08 wt %.

As shown in Table 2, the resulting water-repellent glass plate had an initial critical tilt angle of 80, which was large compared to Examples 1–7, and inferior droplet roll-over. Even when Comparative Example 2 was heated at 200° C. for 30 minutes instead of drying at room temperature, peeling of the film occurred after the abrasion test.

TABLE 1

| | Starting material | Component ratio (molar ratio) | Film composition (mole %) | | | | Water-repellent groups (based on FAS) |
|---|---|---|---|---|---|---|---|
| | | | $SiO_2$ | MgO | CaO | SrO | |
| Examples | | | | | | | |
| 1 | TEOS/MgCl$_2$ · 6H$_2$O | 80/20 | 80 | 20 | 0 | 0 | 2.4 |
| 2 | TEOS/Mg(NO$_3$)$_2$ · 6H$_2$O | 80/20 | 80 | 20 | 0 | 0 | 2.4 |
| 3 | TEOS/Mg(OH)$_2$ · 6H$_2$O | 80/20 | 80 | 20 | 0 | 0 | 2.4 |
| 4 | TEOS/MgO | 80/20 | 80 | 20 | 0 | 0 | 2.4 |
| 5 | TEOS/CaCl$_2$ | 80/20 | 80 | 0 | 20 | 0 | 2.4 |
| 6 | TEOS/Ca(NO$_3$)$_2$ · 4H$_2$O | 80/20 | 80 | 0 | 20 | 0 | 2.4 |

TABLE 1-continued

|  | Starting material | Component ratio (molar ratio) | Film composition (mole %) | | | | Water-repellent groups (based on FAS) |
|---|---|---|---|---|---|---|---|
|  |  |  | $SiO_2$ | MgO | CaO | SrO |  |
| 7 | TEOS/Ca(OH)$_2$ · 4H$_2$O | 80/20 | 80 | 0 | 20 | 0 | 2.4 |
| 8 | TEOS/SrCl$_2$ | 80/20 | 80 | 0 | 0 | 20 | 2.4 |
| 9 | TEOS/Sr(NO$_3$)$_2$ | 80/20 | 80 | 0 | 0 | 20 | 2.4 |
| 10 | TEOS/Sr(OH)$_2$ · 8H$_2$O | 80/20 | 80 | 0 | 0 | 20 | 2.4 |
| Comparative Examples |  |  |  |  |  |  |  |
| 1 | TEOS |  | 100 | 0 | 0 | 0 | 1.8 |
| 2 | TEOS |  | 100 | 0 | 0 | 0 | 2.4 |

TABLE 2

| | Film thickness (nm) | Contact angle (degree) | Critical tilt angle (degree) | Haze value (%) before abrasion test | Haze value (%) after abrasion test/film peeling |
|---|---|---|---|---|---|
| Example 1 | 30 | 108 | 4 | 0.0 | peeling |
| Example 2 | 30 | 108 | 4 | 0.0 | peeling |
| Example 3 | 30 | 108 | 4 | 0.0 | peeling |
| Example 4 | 30 | 108 | 4 | 0.0 | peeling |
| Example 5 | 30 | 108 | 4 | 0.0 | peeling |
| Example 6 | 30 | 108 | 4 | 0.0 | peeling |
| Example 7 | 30 | 108 | 4 | 0.0 | peeling |
| Example 8 | 30 | 108 | 4 | 0.0 | peeling |
| Example 9 | 30 | 108 | 4 | 0.0 | peeling |
| Example 10 | 30 | 108 | 4 | 0.0 | peeling |
| Comparative Example 1 | 40 | 100 | 15 | 0.0 | peeling |
| Comparative Example 2 | 40 | 108 | 7 | 0.0 | peeling |

EXAMPLES 11–32

Water-repellent glass was obtained in the same manner as Example 1, except that the metal atom starting materials and addition amounts in the coating solution of Example 1 and the drying temperature and time after coating were changed to those shown in Table 3. The compositions of the water-repellent films were as shown in Tables 4 and 5. The results of measurement in the same manner as Example 1 are shown in Table 6. The total content of the TEOS and different metal oxide starting materials in the coating solutions (wt % based on $SiO_2$, MgO, CaO, $B_2O_3$, $Al_2O_3$, $Ga_2O_3$, $In_2O_3$, $Sc_2O_3$, $Y_2O_3$, $La_2O_3$, $Ce_2O_3$, CoO, ZnO, $ZrO_2$) was 0.08 wt %.

The resulting films had small initial critical tilt angles of 5–8°, and were very hard water-repellent films with no film peeling even after Taber abrasion.

EXAMPLES 33–36

Water-repellent glass was obtained in the same manner as Example 1, except that the metal atom starting materials and addition amounts in the coating solution of Example 1 and the drying temperature and time after coating were changed to those shown in Table 7. The compositions of the water-repellent films were as shown in Table 8. The results of measurement in the same manner as Example 1 are shown in Table 9. The total content of the TEOS and different metal oxide starting materials in the coating solutions (wt % based on $SiO_2$, MgO, CaO and $B_2O_3$) was 0.08 wt %.

The resulting films had small initial critical tilt angles of 5–7°, and were very hard water-repellent films with no film peeling even after Taber abrasion.

EXAMPLES 37–40

Water-repellent glass was obtained in the same manner as Example 1, except that heptadecafluorodecyl trimethoxysilane was changed to dodecyltrimethoxysilane ($CH_3(CH_2)_9Si(OCH_3)_3$, product of Tokyo Kasei, hereunder also referred to as "AS"), and the metal atom starting materials and addition amounts in the coating solution of Example 1 and the drying temperature and time after coating were changed to those shown in Table 7. The compositions of the water-repellent films were as shown in Table 8. The results of measurement in the same manner as Example 1 are shown in Table 9. The total content of the TEOS and different metal oxide starting materials in the coating solutions (wt % based on $SiO_2$, MgO, CaO, $B_2O_3$ and $ZrO_2$) was 0.08 wt %.

The resulting films had small critical tilt angles, though slightly larger than Example 1, and were hard water-repellent films with no film peeling even after Taber abrasion.

EXAMPLES 41–60

Water-repellent glass was obtained in the same manner as Example 1, except that the metal atom starting materials and addition amounts in the coating solution of Example 1 and the drying temperature and time after coating were changed to those shown in Table 10. The compositions of the water-repellent films were as shown in Table 11. The results of measurement in the same manner as Example 1 are shown in Table 12. The total content of the TEOS and different metal oxide starting materials in the coating solutions (wt % based on $SiO_2$, MgO, CaO, $B_2O_{31}$, $Al_2O_3$, CoO, $Fe_2O_3$, NiO and CuO) was 0.08 wt %.

The resulting films had small critical tilt angles, though slightly larger than Example 1, and were hard water-repellent films with no film peeling even after Taber abrasion.

Also, coloration due to the added transition metals was found in Examples 43–50 and 53–60, so that the resulting water-repellent films were very hard and colored.

COMPARATIVE EXAMPLES 3 and 4

Water-repellent glass was obtained in the same manner as Example 1, except that the metal atom starting materials and addition amounts in the coating solution of Example 1 and the drying temperature and time after coating were changed to those shown in Table 13. The results of measurement in the same manner as Example 1 are shown in Table 14. The total content of the TEOS and different metal oxide starting materials in the coating solutions (wt % based on $SiO_2$, $La_2O_3$ and CoO) was 0.08 wt %.

Comparative Examples 3 and 4 both had inferior outer appearances of the films, and their hardnesses were such that the films completely peeled off after the Taber test.

TABLE 3

| Example | Starting material | Component ratio (molar ratio) | Heating temperature/time |
|---|---|---|---|
| 11 | TEOS/MgCl$_2$ · 6H$_2$O/H$_3$BO$_3$ | 98/1/1 | 100° C.-30 min. |
| 12 | TEOS/CaCl$_2$/H$_3$BO$_3$ | 98/1/1 | 100° C.-30 min. |
| 13 | TEOS/MgCl$_2$ · 6H$_2$O/AlCl$_3$ · 6H$_2$O | 97/2/1 | 200° C.-30 min. |
| 14 | TEOS/CaCl$_2$/AlCl$_3$ · 6H$_2$O | 97/2/1 | 200° C.-30 min. |
| 15 | TEOS/MgCl$_2$6H$_2$O/GaCl$_3$ | 97/2/1 | 200° C.-30 min. |
| 16 | TEOS/CaCl$_2$/GaCl$_3$ | 97/2/1 | 200° C.-30 min. |
| 17 | TEOS/MgCl$_2$6H$_2$O/InCl$_3$ · 4H$_2$O | 97/2/1 | 200° C.-30 min. |
| 18 | TEOS/CaCl$_2$/InCl$_3$ · 4H$_2$O | 97/2/1 | 200° C.-30 min. |
| 19 | TEOS/MgCl$_2$6H$_2$O/ScCl$_3$ · 6H$_2$O | 97/2/1 | 200° C.-30 min. |
| 20 | TEOS/CaCl$_2$/ScCl$_3$ · 6H$_2$O | 97/2/1 | 200° C.-30 min. |
| 21 | TEOS/MgCl$_2$6H$_2$O/YCl$_3$ · 6H$_2$O | 97/2/1 | 200° C.-30 min. |
| 22 | TEOS/CaCl$_2$/YCl$_3$ · 6H$_2$O | 97/2/1 | 200° C.-30 min. |
| 23 | TEOS/MgCl$_2$6H$_2$O/LaCl$_3$ · 7H$_2$O | 97/2/1 | 200° C.-30 min. |
| 24 | TEOS/CaCl$_2$/LaCl$_3$ · 7H$_2$O | 97/2/1 | 200° C.-30 min. |
| 25 | TEOS/MgCl$_2$6H$_2$O/CeCl$_3$ · 7H$_2$O | 97/2/1 | 200° C.-30 min. |
| 26 | TEOS/CaCl$_2$/CeCl$_3$ · 7H$_2$O | 97/2/1 | 200° C.-30 min. |
| 27 | TEOS/MgCl$_2$ · 6H$_2$O/CoCl$_2$ · 6H$_2$O | 97/2/1 | 200° C.-30 min. |
| 28 | TEOS/CaCl$_2$/CoCl$_2$ · 6H$_2$O | 97/2/1 | 200° C.-30 min. |
| 29 | TEOS/MgCl$_2$ · 6H$_2$O/ZnCl$_2$ | 97/2/1 | 200° C.-30 min. |
| 30 | TEOS/CaCl$_2$ · ZnCl$_2$ | 97/2/1 | 200° C.-30 min. |
| 31 | TEOS/MgCl$_2$ · 6H$_2$O/ZrOCl$_2$ · 8H$_2$O | 98/1/1 | 100° C.-30 min. |
| 32 | TEOS/CaCl$_2$/ZrOCl$_2$ · 8H$_2$O | 98/1/1 | 100° C.-30 min. |

TABLE 6

| Example | Film thickness (nm) | Contact angle (degree) | Critical tilt angle (degree) | Haze value (%) before abrasion test | Haze value (%) after abrasion test/film peeling |
|---|---|---|---|---|---|
| 11 | 30 | 109 | 6 | 0.0 | 1.2 |
| 12 | 30 | 110 | 6 | 0.1 | 0.9 |
| 13 | 30 | 108 | 7 | 0.2 | 1.1 |
| 14 | 30 | 107 | 8 | 0.1 | 1.3 |
| 15 | 30 | 107 | 7 | 0.1 | 1.1 |
| 16 | 30 | 108 | 7 | 0.1 | 1.2 |
| 17 | 30 | 109 | 7 | 0.2 | 1.2 |
| 18 | 30 | 108 | 8 | 0.1 | 1.4 |
| 19 | 30 | 107 | 8 | 0.1 | 1.1 |
| 20 | 30 | 108 | 7 | 0.0 | 1.1 |
| 21 | 30 | 107 | 7 | 0.1 | 1.3 |
| 22 | 30 | 107 | 8 | 0.0 | 1.1 |
| 23 | 30 | 107 | 8 | 0.0 | 1.2 |
| 24 | 30 | 107 | 8 | 0.1 | 1.4 |
| 25 | 30 | 108 | 8 | 0.0 | 1.2 |
| 26 | 30 | 107 | 7 | 0.2 | 1.3 |
| 27 | 30 | 107 | 8 | 0.1 | 1.2 |
| 28 | 30 | 108 | 7 | 0.1 | 1.4 |
| 29 | 30 | 108 | 8 | 0.1 | 1.2 |
| 30 | 30 | 107 | 8 | 0.0 | 1.3 |
| 31 | 30 | 109 | 5 | 0.0 | 0.9 |
| 32 | 30 | 109 | 6 | 0.0 | 1.0 |

TABLE 4

| | Film composition (mole %) | | | | | | | | |
|---|---|---|---|---|---|---|---|---|---|
| Example | SiO$_2$ | MgO | CaO | B$_2$O$_3$ | Al$_2$O$_3$ | Ga$_2$O$_3$ | In$_2$O$_3$ | Sc$_2$O$_3$ | Water-repellent groups (based on FAS) |
| 11 | 98.5 | 1.0 | 0 | 0.5 | 0 | 0 | 0 | 0 | 2.4 |
| 12 | 98.5 | 0 | 1.0 | 0.5 | 0 | 0 | 0 | 0 | 2.4 |
| 13 | 97.5 | 2.0 | 0 | 0 | 0.5 | 0 | 0 | 0 | 2.4 |
| 14 | 97.5 | 0 | 2.0 | 0 | 0.5 | 0 | 0 | 0 | 2.4 |
| 15 | 97.5 | 2.0 | 0 | 0 | 0 | 0.5 | 0 | 0 | 2.4 |
| 16 | 97.5 | 0 | 2.0 | 0 | 0 | 0.5 | 0 | 0 | 2.4 |
| 17 | 97.5 | 2.0 | 0 | 0 | 0 | 0 | 0.5 | 0 | 2.4 |
| 18 | 97.5 | 0 | 2.0 | 0 | 0 | 0 | 0.5 | 0 | 2.4 |
| 19 | 97.5 | 2.0 | 0 | 0 | 0 | 0 | 0 | 0.5 | 2.4 |
| 20 | 97.5 | 0 | 0 | 0 | 0 | 0 | 0 | 0.5 | 2.4 |

TABLE 5

| | Film composition (mole %) | | | | | | | | |
|---|---|---|---|---|---|---|---|---|---|
| Example | SiO$_2$ | MgO | CaO | ZrO$_2$ | Y$_2$O$_3$ | La$_2$O$_3$ | Ce$_2$O$_3$ | CoO | ZnO | Water-repellent groups (based on FAS) |
| 21 | 97.5 | 2.0 | 0 | 0 | 0.5 | 0 | 0 | 0 | 0 | 2.4 |
| 22 | 97.5 | 0 | 2.0 | 0 | 0.5 | 0 | 0 | 0 | 0 | 2.4 |
| 23 | 97.5 | 2.0 | 0 | 0 | 0 | 0.5 | 0 | 0 | 0 | 2.4 |
| 24 | 97.5 | 0 | 2.0 | 0 | 0 | 0.5 | 0 | 0 | 0 | 2.4 |
| 25 | 97.0 | 2.0 | 0 | 0 | 0 | 0 | 1.0 | 0 | 0 | 2.4 |
| 26 | 97.0 | 0 | 2.0 | 0 | 0 | 0 | 1.0 | 0 | 0 | 2.4 |
| 27 | 97.0 | 2.0 | 0 | 0 | 0 | 0 | 0 | 1.0 | 0 | 2.4 |
| 28 | 97.0 | 0 | 2.0 | 0 | 0 | 0 | 0 | 1.0 | 0 | 2.4 |
| 29 | 97.0 | 2.0 | 0 | 0 | 0 | 0 | 0 | 0 | 1.0 | 2.4 |
| 30 | 97.0 | 0 | 2.0 | 0 | 0 | 0 | 0 | 0 | 1.0 | 2.4 |
| 31 | 98.0 | 1.0 | 0 | 1.0 | 0 | 0 | 0 | 0 | 0 | 2.4 |
| 32 | 98.0 | 0 | 2.0 | 1.0 | 0 | 0 | 0 | 0 | 0 | 2.4 |

TABLE 7

| Example | Starting material | Component ratio (molar ratio) | Heating temperature/time |
|---|---|---|---|
| 33 | TEOS/MgCl$_2$ · 6H$_2$O | 80/20 | 200° C.-30 min. |
| 34 | TEOS/CaCl$_2$ | 80/20 | 200° C.-30 min. |
| 35 | TEOS/H$_3$BO$_3$ | 95/5 | 200° C.-30 min. |
| 36 | TEOS/H$_3$BO$_3$ | 99/1 | 200° C.-30 min. |
| 37 | TEOS/MgCl$_2$ · 6H$_2$O/H$_3$BO$_3$ | 98/1/1 | 200° C.-30 min. |
| 38 | TEOS/CaCl$_2$/H$_3$BO$_3$ | 98/1/1 | 200° C.-30 min. |
| 39 | TEOS/MgCl$_2$ · 6H$_2$O/ZrOCl$_2$ · 8H$_2$O | 98/1/1 | 200° C.-30 min. |
| 40 | TEOS/CaCl$_2$/ZrOCl$_2$ · 8H$_2$O | 98/1/1 | 200° C.-30 min. |

TABLE 8

| Example | Film composition (mole %) | | | | | Water-repellent groups (based on FAS or AS) |
|---|---|---|---|---|---|---|
| | SiO$_2$ | MgO | CaO | B$_2$O$_3$ | ZrO$_2$ | |
| 33 | 80 | 20 | 0 | 0 | 0 | 0.036 |
| 34 | 80 | 0 | 20 | 0 | 0 | 0.036 |
| 35 | 95 | 0 | 0 | 5 | 0 | 0.036 |
| 36 | 99 | 0 | 0 | 1 | 0 | 0.036 |
| 37 | 98.5 | 1 | 0 | 0.5 | 0 | 0.036 |
| 38 | 98.5 | 0 | 1 | 0.5 | 0 | 0.036 |
| 39 | 98.0 | 1 | 0 | 0 | 1 | 0.036 |
| 40 | 98.0 | 0 | 1 | 0 | 1 | 0.036 |

TABLE 9

| Example | Film thickness (nm) | Contact angle (degree) | Critical tilt angle (degree) | Haze value (%) before abrasion test | Haze value (%) after abrasion test/film peeling |
|---|---|---|---|---|---|
| 33 | 30 | 109 | 6 | 0.0 | 1.1 |
| 34 | 30 | 109 | 7 | 0.0 | 1.2 |
| 35 | 30 | 109 | 6 | 0.0 | 1.1 |
| 36 | 30 | 109 | 5 | 0.0 | 1.0 |
| 37 | 30 | 109 | 6 | 0.0 | 1.0 |
| 38 | 30 | 109 | 6 | 0.0 | 1.0 |
| 39 | 30 | 109 | 5 | 0.0 | 0.9 |
| 40 | 30 | 109 | 6 | 0.0 | 1.0 |

TABLE 10

| Example | Starting material (component ratio (molar ratio)) | Heating temperature/time |
|---|---|---|
| 41 | TEOS/MgCl$_2$ · 6H$_2$O/H$_3$BO$_3$/AlCl$_3$ · 6H$_2$O(96/2/1/1) | 200° C.-30 min. |
| 42 | TEOS/CaCl$_2$/H$_3$BO$_3$/AlCl$_3$ · 6H$_2$O(96/2/1/1) | 200° C.-30 min. |
| 43 | TEOS/MgCl$_2$ · 6H$_2$O/H$_3$BO$_3$/CoCl$_2$ · 6H$_2$O(93/2/1/4) | 200° C.-30 min. |
| 44 | TEOS/CaCl$_2$/H$_3$BO$_3$/CoCl$_2$ · 6H$_2$O(93/2/1/4) | 200° C.-30 min. |
| 45 | TEOS/MgCl$_2$ · 6H$_2$O/H$_3$BO$_3$/FeCl$_2$ (93/2/1/4) | 200° C.-30 min. |
| 46 | TEOS/CaCl$_2$/H$_3$BO$_3$/FeCl$_2$ (93/2/1/4) | 200° C.-30 min. |
| 47 | TEOS/MgCl$_2$ · 6H$_2$O/H$_3$BO$_3$/NiCl$_2$ · 6H$_2$O(93/2/1/4) | 200° C.-30 min. |
| 48 | TEOS/CaCl$_2$/H$_3$BO$_3$/NiCl$_2$ · 6H$_2$O(93/2/1/4) | 200° C.-30 min. |
| 49 | TEOS/MgCl$_2$ · 6H$_2$O/H$_3$BO$_3$/CuCl$_2$ · 4H$_2$O(93/2/1/4) | 200° C.-30 min. |
| 50 | TEOS/CaCl$_2$/H$_3$BO$_3$/CuCl$_2$ · 4H$_2$O(93/2/1/4) | 200° C.-30 min. |
| 51 | TEOS/MgCl$_2$ · 6H$_2$O/ZrO(NO$_3$)$_2$ · 8H$_2$O/AlCl$_3$ · 6H$_2$O(96/2/1/1) | 200° C.-30 min. |
| 52 | TEOS/CaCl$_2$/ZrO(NO$_3$)$_2$ · 8H$_2$O/AlCl$_3$ · 6H$_2$O(96/2/1/1) | 200° C.-30 min. |
| 53 | TEOS/MgCl$_2$ · 6H$_2$O/ZrOCl$_2$ · 8H$_2$O/CoCl$_2$ · 6H$_2$O(96/2/1/4) | 200° C.-30 min. |
| 54 | TEOS/CaCl$_2$/ZrOCl$_2$ · 8H$_2$O/CoCl$_2$ · 6H$_2$O(93/2/1/4) | 200° C.-30 min. |
| 55 | TEOS/MgCl$_2$ · 6H$_2$O/ZrOCl$_2$ · 8H$_2$O/FeCl$_2$ (93/2/1/4) | 200° C.-30 min. |
| 56 | TEOS/CaCl$_2$/ZrOCl$_2$ · 8H$_2$O/FeCl$_2$ (93/2/1/4) | 200° C.-30 min. |
| 57 | TEOS/MgCl$_2$ · 6H$_2$O/ZrOCl$_2$ · 8H$_2$O/NiCl$_2$ · 6H$_2$O(93/2/1/4) | 200° C.-30 min. |
| 58 | TEOS/CaCl$_2$/ZrOCl$_2$ · 8H$_2$O/NiCl$_2$ · 6H$_2$O(93/2/1/4) | 200° C.-30 min. |
| 59 | TEOS/MgCl$_2$ · 6H$_2$O/ZrOCl$_2$ · 8H$_2$O/CuCl$_2$ · 4H$_2$O(93/2/1/4) | 200° C.-30 min. |
| 60 | TEOS/CaCl$_2$/ZrOCl$_2$ · 8H$_2$O/CuCl$_2$ · 4H$_2$O(93/2/1/4) | 200° C.-30 min. |

TABLE 11

| Example | Film composition (mole %) | | | | | | | | | |
|---|---|---|---|---|---|---|---|---|---|---|
| | SiO$_2$ | MgO | CaO | B$_2$O$_3$ | ZrO$_2$ | Al$_2$O$_3$ | CoO | Fe$_2$O$_3$ | NiO | CuO |
| 41 | 97.0 | 2.0 | 0 | 0.5 | 0 | 0.5 | 0 | 0 | 0 | 0 |
| 42 | 97.0 | 0 | 2.0 | 0.5 | 0 | 0.5 | 0 | 0 | 0 | 0 |
| 43 | 93.5 | 2.0 | 0 | 0.5 | 0 | 0 | 4.0 | 0 | 0 | 0 |
| 44 | 93.5 | 0 | 2.0 | 0.5 | 0 | 0 | 4.0 | 0 | 0 | 0 |
| 45 | 95.4 | 2.1 | 0 | 0.5 | 0 | 0 | 0 | 2.1 | 0 | 0 |
| 46 | 95.4 | 0 | 2.1 | 0.5 | 0 | 0 | 0 | 2.1 | 0 | 0 |
| 47 | 93.5 | 2.0 | 0 | 0.5 | 0 | 0 | 0 | 0 | 4.0 | 0 |
| 48 | 93.5 | 0 | 2.0 | 0.5 | 0 | 0 | 0 | 0 | 4.0 | 0 |
| 49 | 93.5 | 2.0 | 0 | 0.5 | 0 | 0 | 0 | 0 | 0 | 4.0 |
| 50 | 93.5 | 0 | 2.0 | 0.5 | 0 | 0 | 0 | 0 | 0 | 4.0 |
| 51 | 96.5 | 2.0 | 0 | 0 | 1.0 | 0.5 | 0 | 0 | 0 | 0 |
| 52 | 96.5 | 0 | 2.0 | 0 | 1.0 | 0.5 | 0 | 0 | 0 | 0 |

TABLE 11-continued

| | Film composition (mole %) | | | | | | | | | |
|---|---|---|---|---|---|---|---|---|---|---|
| Example | SiO$_2$ | MgO | CaO | B$_2$O$_3$ | ZrO$_2$ | Al$_2$O$_3$ | CoO | Fe$_2$O$_3$ | NiO | CuO |
| 53 | 96.0 | 2.0 | 0 | 0 | 1.0 | 0 | 4.0 | 0 | 0 | 0 |
| 54 | 96.0 | 0 | 2.0 | 0 | 1.0 | 0 | 4.0 | 0 | 0 | 0 |
| 55 | 94.9 | 2.0 | 0 | 0 | 1.0 | 0 | 0 | 2.0 | 0 | 0 |
| 56 | 94.9 | 0 | 2.0 | 0 | 1.0 | 0 | 0 | 2.0 | 0 | 0 |
| 57 | 93.0 | 2.0 | 0 | 0 | 1.0 | 0 | 0 | 0 | 4.0 | 0 |
| 58 | 93.0 | 0 | 2.0 | 0 | 1.0 | 0 | 0 | 0 | 4.0 | 0 |
| 59 | 93.0 | 2.0 | 0 | 0 | 1.0 | 0 | 0 | 0 | 0 | 4.0 |
| 60 | 93.0 | 0 | 2.0 | 0 | 1.0 | 0 | 0 | 0 | 0 | 4.0 |

TABLE 12

| Example | Film thickness (nm) | Contact angle (degree) | Critical tilt angle (degree) | Haze value (%) before abrasion test | Haze value (%) after abrasion test/film peeling |
|---|---|---|---|---|---|
| 41 | 30 | 109 | 6 | 0.0 | 1.2 |
| 42 | 30 | 110 | 6 | 0.1 | 0.9 |
| 43 | 30 | 108 | 7 | 0.2 | 1.1 |
| 44 | 30 | 107 | 8 | 0.1 | 1.3 |
| 45 | 30 | 107 | 7 | 0.1 | 1.1 |
| 46 | 30 | 108 | 7 | 0.1 | 1.2 |
| 47 | 30 | 109 | 7 | 0.2 | 1.2 |
| 48 | 30 | 108 | 8 | 0.1 | 1.4 |
| 49 | 30 | 107 | 8 | 0.1 | 1.1 |
| 50 | 30 | 108 | 7 | 0.0 | 1.1 |
| 51 | 30 | 107 | 7 | 0.1 | 1.3 |
| 52 | 30 | 107 | 8 | 0.0 | 1.1 |
| 53 | 30 | 107 | 8 | 0.0 | 1.2 |
| 54 | 30 | 107 | 8 | 0.1 | 1.4 |
| 55 | 30 | 108 | 8 | 0.0 | 1.2 |
| 56 | 30 | 107 | 7 | 0.2 | 1.3 |
| 57 | 30 | 107 | 8 | 0.1 | 1.2 |
| 58 | 30 | 108 | 7 | 0.1 | 1.4 |
| 59 | 30 | 108 | 8 | 0.1 | 1.2 |
| 60 | 30 | 107 | 8 | 0.0 | 1.3 |

TABLE 13

| Comparative Example | Starting material (molar ratio) | Heating temperature/time |
|---|---|---|
| 3 | TEOS/CoCl$_2$ · 6H$_2$O(98/2) | 250° C.-30 min. |
| 4 | TEOS/LaCl$_3$ · 7H$_2$O(98/2) | 250° C.-30 min. |

TABLE 14

| Comparative Example | Film thickness (nm) | Contact angle (degree) | Critical tilt angle (degree) | Haze value (%) before abrasion test | Haze value (%) after abrasion test/film peeling |
|---|---|---|---|---|---|
| 3 | 30 | 107 | 8 | 11.1 | peeling |
| 4 | 30 | 107 | 7 | 8.1 | peeling |

INDUSTRIAL APPLICABILITY

As explained above, by providing a primary oxide film as a composite oxide film with two or more components including SiO$_2$ and at least one selected from among MgO, CaO, SrO and B$_2$O$_3$ in a water-repellent film-coated article having an integrally formed primary oxide layer and a water-repellent layer by a single coating treatment according to the present invention, it is possible to drastically improve the hardness of the water-repellent film with the integrally formed primary layer and water-repellent layer. According to the invention there is no need for high-temperature sintering after formation of the water-repellent film, and therefore large-sized equipment is not required so that preparation costs may be reduced.

Moreover, since a silane compound including water-repellent groups such as alkyl groups or fluoroalkyl groups is added to the water-repellent coating solution, it is possible to form the primary oxide layer and water-repellent layer by application of one type of solution, thus allowing better productivity.

In addition, since the water-repellent groups are naturally oriented during film formation according to the invention, it is possible to form a water-repellent layer with satisfactory orientation. The water-repellent articles of the invention therefore have very excellent water droplet roll-over properties and high abrasion resistance.

What is claimed is:

1. A water-repellent film-coated article comprising: a substrate and a water-repellent film, wherein the water-repellent film is composed of:
    silica, which is derived from a silane bearing four hydrolyzable groups, at 70–99 mole percent (based on SiO$_2$);
    at least one metal oxide selected from the group consisting of magnesium oxide, calcium oxide, strontium oxide, and boron oxide, at a total of 1–30 mole percent (based on MgO, CaO, SrO, and BO$_{3/2}$); and
    a water-repellent group at 0.01–20 wt %; wherein said water-repellent film is coated on the outer-most surface of the substrate.

2. A water-repellent film-coated article according to claim 1, wherein said water-repellent film further contains at least one metal oxide selected from the group consisting of zirconium oxide, aluminum oxide, gallium oxide, indium oxide, scandium oxide, yttrium oxide, lanthanum oxide, cerium oxide, cobalt oxide, iron oxide, nickel oxide, copper oxide and zinc oxide at 0.5–5 mole percent (based on ZrO$_2$, AlO$_{3/2}$, GaO$_{3/2}$, InO$_{3/2}$, ScO$_{3/2}$, YO$_{3/2}$, LaO$_{3/2}$, CeO$_{3/2}$, CoO, FeO$_{3/2}$, NiO$_2$, CuO and ZnO).

3. A water-repellent film-coated article according to claim 1, wherein said water-repellent film contains
    silica at 70–98 mole percent (based on SiO$_2$),
    magnesium oxide and/or calcium oxide at 1–29 mole percent (based on MgO and CaO),
    boron oxide and/or zirconium oxide at 1–29 mole percent (based on BO$_{3/2}$ and ZrO$_2$) and
    a water-repellent group at 0.01–20 wt %.

4. A water-repellent film-coated article according to claim 3, wherein said water-repellent film further contains at least one metal oxide selected from the group consisting of aluminum oxide, gallium oxide, indium oxide, scandium oxide, yttrium oxide, lanthanum oxide, cerium oxide, cobalt oxide, iron oxide, nickel oxide, copper oxide and zinc oxide at 0.5–5 mole percent (based on $AlO_{3/2}$, $GaO_{3/2}$, $InO_{3/2}$, $ScO_{3/2}$, $YO_{3/2}$, $LaO_{3/2}$, $CeO_{3/2}$, $CoO$, $FeO_{3/2}$, $NiO_2$, $CuO$ and $ZnO$).

5. A water-repellent film-coated article according to any one of claims 2, 3, or 4, wherein said water-repellent group is an alkyl group or fluoroalkyl group.

6. A water-repellent film-coated article according to of claims 1, 2, 3, or 4, wherein said substrate is a glass plate.

7. A water-repellent film-coated article comprising: a substrate and a water-repellent film consisting essentially of:

- silica, which is derived from a silane bearing four hydrolyzable groups, at 70–99 mole percent (based on $SiO_2$);
- at least one metal oxide selected from the group consisting of magnesium oxide, calcium oxide, strontium oxide, and boron oxide, at a total of 1–30 mole percent (based on MgO, CaO, SrO, and $BO_{3/2}$);
- at least one metal oxide selected from the group consisting of zirconium oxide, aluminum oxide, gallium oxide, indium oxide, scandium oxide, yttrium oxide, lanthanum oxide, cerium oxide, cobalt oxide, iron oxide, nickel oxide, copper oxide and zinc oxide, at 0–5 mole percent (based on $ZrO_2$, $AlO_{3/2}$, $GaO_{3/2}$, $InO_{3/2}$, $ScO_{3/2}$, $YO_{3/2}$, $LaO_{3/2}$, $CeO_{3/2}$, $CoO$, $FeO_{3/2}$, $NiO_2$, $CuO$, and $ZnO$); and
- a water-repellent group at 0.01–20 wt %; wherein said water-repellent film is coated on the outer-most surface of the substrate.

* * * * *